United States Patent
Ki et al.

(10) Patent No.: US 9,664,444 B2
(45) Date of Patent: May 30, 2017

(54) SLAG DISCHARGE DOOR DEVICE FOR AN ELECTRIC FURNACE

(75) Inventors: Joon-Seong Ki, Incheon (KR); Jin-Ill Hwang, Incheon (KR)

(73) Assignee: Hyundai Steel Company, Incheon (KR)

( * ) Notice: Subject to any disclaimer, the term of this patent is extended or adjusted under 35 U.S.C. 154(b) by 978 days.

(21) Appl. No.: 13/989,711

(22) PCT Filed: Aug. 30, 2011

(86) PCT No.: PCT/KR2011/006425
§ 371 (c)(1),
(2), (4) Date: May 24, 2013

(87) PCT Pub. No.: WO2012/074186
PCT Pub. Date: Jun. 7, 2012

(65) Prior Publication Data
US 2013/0250996 A1  Sep. 26, 2013

(30) Foreign Application Priority Data

Nov. 29, 2010 (KR) .................. 10-2010-0119540
Dec. 29, 2010 (KR) .................. 10-2010-0138309

(51) Int. Cl.
*F27D 3/00* (2006.01)
*F27D 1/00* (2006.01)
(Continued)

(52) U.S. Cl.
CPC ............... *F27B 3/105* (2013.01); *C21B 3/04* (2013.01); *C21C 5/54* (2013.01); *F27B 3/085* (2013.01);
(Continued)

(58) Field of Classification Search
CPC .. F27B 3/085; F27B 3/19; F27B 3/105; F27B 3/10; F27B 3/24; F27B 3/08; F27D 3/159;
(Continued)

(56) References Cited

U.S. PATENT DOCUMENTS 1,313,491 A * 8/1919 Lazzell ................ B65D 47/286
105/280
4,964,238 A * 10/1990 Nishijima ............. E05F 11/486
49/349
(Continued)

FOREIGN PATENT DOCUMENTS

CN         1084631 A      3/1994
JP         06-235590      8/1994
(Continued)

*Primary Examiner* — Hung D Nguyen
(74) *Attorney, Agent, or Firm* — Mintz Levin Cohn Ferris Glovsky and Popeo, P.C.

(57) ABSTRACT

A slag discharge door device for an electric furnace is provided. The device prevents slag from flowing out via a slag discharge port by making a discharge control door body move up and down to and from the upper surface of a supporting body where slag is discharged by flowing to the upper surface, and the discharge of slag is controlled, such that during steel-making work in the electric furnace, the outflow of slag is prevented and heat losses are reduced, the efficiency of arc heat due to the formation of foamed slag is increased, and valuable metals are recovered from the molten slag thereby increasing the percentage of molten steel recovered.

7 Claims, 10 Drawing Sheets

(51) Int. Cl.
  *C21B 9/10* (2006.01)
  *F27B 3/10* (2006.01)
  *F27B 3/08* (2006.01)
  *F27B 3/19* (2006.01)
  *F27D 1/18* (2006.01)
  *F27D 3/15* (2006.01)
  *C21C 5/54* (2006.01)
  *C21B 3/04* (2006.01)
  *F27D 3/16* (2006.01)

(52) U.S. Cl.
  CPC .............. *F27B 3/19* (2013.01); *F27D 1/1858* (2013.01); *F27D 3/1545* (2013.01); *F27D 3/1554* (2013.01); *C21C 2300/02* (2013.01); *F27D 2001/1875* (2013.01); *F27D 2003/168* (2013.01); *Y02P 10/216* (2015.11)

(58) Field of Classification Search
  CPC .... F27D 3/1536; F27D 3/1554; F27D 3/1545; F27D 3/15; F27D 3/14; F27D 1/1858; F27D 1/18; F27D 2001/1875; F27D 3003/186; C21C 5/54; C21C 2300/02; C21B 3/04; Y02P 10/216
  USPC .......... 373/71, 72, 75, 79, 84; 266/135, 272, 266/271, 227, 44
  See application file for complete search history.

(56) References Cited

U.S. PATENT DOCUMENTS

| | | | | |
|---|---|---|---|---|
| 6,000,938 | A | * | 12/1999 | Melanowicz ........... F27B 17/02 432/242 |
| 2011/0038391 | A1 | * | 2/2011 | Miani ..................... F27B 3/085 373/71 |

FOREIGN PATENT DOCUMENTS

| | | | | |
|---|---|---|---|---|
| JP | 6-235590 | A | * | 8/1994 |
| JP | 08-110163 | | | 4/1996 |
| JP | 08-226766 | | | 9/1996 |
| JP | 09-133475 | | | 5/1997 |
| JP | 9-133475 | A | * | 5/1997 |
| KR | 10-2004-0091373 | A | | 10/2004 |

* cited by examiner

FIG. 10

SLAG DISCHARGE DOOR DEVICE FOR AN ELECTRIC FURNACE

CROSS-REFERENCES TO RELATED APPLICATIONS

This application is a U.S. national phase application, pursuant to 35 U.S.C. §371, of PCT/KR2011/006425, filed Aug. 30, 2011, designating the United States, which claims priority to Korean Application No. 10-2010-0119540, filed Nov. 29, 2010, and Korean Application No. 10-2010-0138309, filed Dec. 29, 2010. The entire contents of the aforementioned patent applications are incorporated herein by this reference.

TECHNICAL FIELD

The present invention relates to a slag discharge door device for an electric furnace and, more particularly, to a slag discharge door device for an electric furnace wherein initial slag is prevented from flowing out via a slag discharge port.

BACKGROUND ART

As is well known to those skilled in the art, electric furnaces heat and melt metal or alloys using electric energy. Electric furnaces are charged with scrap and melt the scrap into molten steel by means of an electric arc generated by electrode rods.

During a steel-making process using electric furnaces, impurities in the scrap are fused into slag in the type of oxides on molten metal.

Slag floats on molten metal and serves to prevent the surface of the molten metal from being oxidized by air and protects the surface of the molten metal, wherein mass transfer and a chemical reaction occur at an interface between the slag and molten metal.

SUMMARY OF THE DISCLOSURE

Accordingly, the present invention has been made keeping in mind the above problems occurring in the prior art, and an object of the present invention is to provide a slag discharge door device for an electric furnace which prevents an outflow of slag during a steel-making process in an electric furnace, and has improved durability and increased lifetime even in frequent contact with slag.

In order to accomplish the above object, in an aspect, the present invention provides a slag discharge door device for an electric furnace including: a support body disposed at a lower portion of a slag discharge port formed on one side of the electric furnace and over which slag flows out; a discharge control door body moving up and down from an upper surface of the support body to control the discharge of slag; and a door actuator moving the discharge control door body up and down.

As described above, according to the present invention, the outflow of slag during a steel-making process in an electric furnace is prevented, having the effects of reducing heat losses due to the outflow of slag, increasing the efficiency of arc heating due to the formation of foamed slag, and recovering valuable metals from the molten slag thereby increasing the percentage of molten steel recovered.

Further, according to the present invention, a door body is formed with heterogeneous materials of a high heat-conductive material and a hard material, so that heat transferred from the slag when the outflow of slag is prevented is effectively dissipated to thereby minimize thermal deformation and damage and provide increased durability and lifetime, enabling safe long-term use of the device.

*Description of major parts in the drawings*

| | |
|---|---|
| 1: Electric furnace | 2: Ceiling member |
| 3: Slag | 4: Discharge control door body |
| 5: Support body | 10: Base door body member |
| 11: Guide protrusion | 12: Step portion |
| 13: Hard coating layer | 14: Cooling channel |
| 20: Door-reinforcing body member | 30: $1^{st}$ guide plate member |
| 31: $2^{nd}$ guide plate member | 32: Guide roller member |
| 40: Slag-guide support member | 50: Door actuator |
| 60: Upper door | 70: Upper door actuator |
| 80: Air jet unit | |

DETAILED DESCRIPTION OF THE DISCLOSURE

The present invention will now be described with reference to the accompanying drawings.

Figure 1:
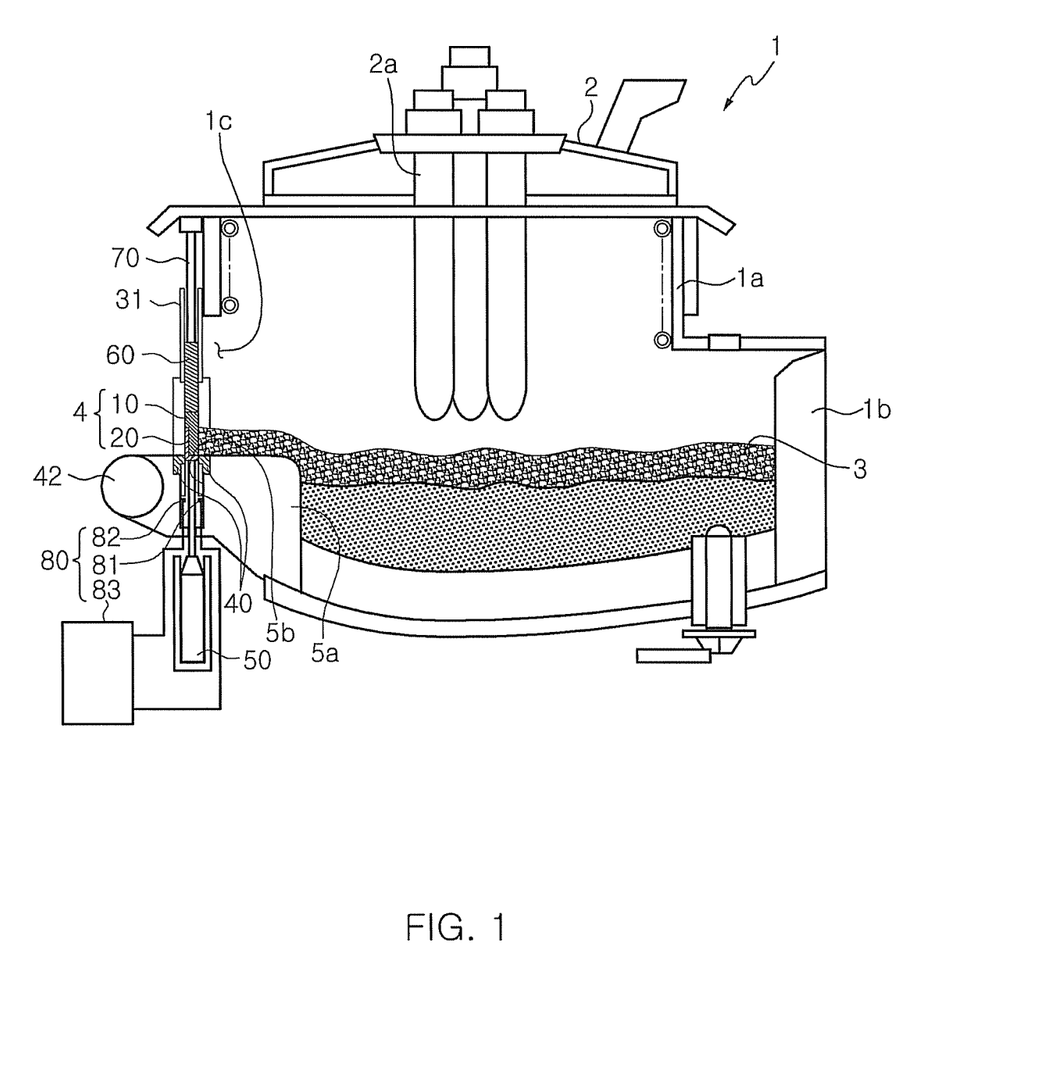
FIG. 1 is a pictorial view of the structure of a slag discharge door device for an electric furnace according to an embodiment of the present invention.

As shown in FIG. 1, an electric furnace 1 has a slag discharge port 1c on one side thereof so as to discharge slag 3 which is generated in the electric furnace during a steel-making process.

The electric furnace 1 has a space in which scrap is put down and is melted. The electric furnace has a body that consists of upper and lower bodies 1a and 1b, wherein a refractory wall formed with refractory bricks is formed on an inner surface of the lower body 1b to protect an inner wall of the lower body, and a cooling panel member through which cooling water is circulated is mounted on an inner surface of the upper body to protect an inner wall of the upper body.

A ceiling member 2 is coupled to an open upper portion of the electric furnace 1 to cover the open upper portion. The ceiling member also has a plurality of electrode rods 2a which generates arc heat.

Although not shown in the drawing, the ceiling member 2 is connected with an exhaust pipe through which a large quantity of exhaust gas, dust, and the like, which are discharged during a melting process, is discharged.

The electric furnace 1 generates an arc current between electrodes and scrap and thus melts the scrap.

The slag discharge port 1c is formed on one side of the electric furnace, separately from a molten steel discharge port, via which molten steel is discharged from the electric furnace 1, in order to discharge slag 3 which is generated during a steel-making process in the electric furnace 1.

A slag discharge door device according to the present invention includes a support body 5 which is disposed at a lower portion of the slag discharge port 1c and over which the slag flows out.

A discharge control door body 4 protrudes from an upper surface of the support body 5 so as to prevent the outflow of the slag at the slag discharge port 1c. The discharge control door body 4 is moved up and down by a door actuator 50 so as to control the discharge of the slag via the slag discharge port 1c.

The discharge control door body 4 is moved up and down by the door actuator 50, which is illustratively actuated by either using a hydraulic or pneumatic cylinder equipped with a piston rod connected to a lower surface of the discharge control door body 4 or converting rotary force of an electric motor to a linear motion using the electric motor.

The door actuator 50 may be provided with one or more door actuators.

Although a shape or operation mode thereof is different, the hydraulic or pneumatic cylinder or the electric motor aims at actuating a door member, so it will be hereinafter collectively called a hydraulic cylinder.

The hydraulic cylinder moves the piston rod with the control of hydraulic pressure supplied into the cylinder, to thereby move the discharge control rod body 4 up and down.

The upper surface of the support body 5 is formed flat, and is preferably provided at its outlet end with a circular discharge guide 42, so that when slag flows along the upper surface out and drops at the outlet end, the flat upper surface and the discharge guide facilitate smooth outflow of the slag 3.

The support body 5 and the discharge control door body 4 are formed of high heat-conductive and heat-resistant metal materials, so that thermal deformation due to high temperature slag 3 and adherence of the slag 3 to the surfaces thereof are prevented, facilitating easy separation of solidified slag.

The support body 5 includes a base support body member 5a having a door accommodation part 5b into which the discharge control door body 4 is inserted. The discharge control door body 4 is vertically moved in the door accommodation part 5b by the door actuator 50 from an initial position at which the upper surface thereof coincides with an upper surface of the base support body member 5a, thereby controlling the outflow of the slag.

The slag discharge door device of the invention may preferably further include an upper door member 60 and an upper door actuator 70 which is actuated to move the upper door member 60 up and down. The upper door member 60 is vertically moved from the upper portion of the discharge control door body 4 at the slag discharge port 1c so as to open and close the slag discharge port 1c.

The upper door member 60 is vertically moved from the upper portion of the discharge control door body 4 which is inserted between first and second guide plates 30 and 31, which will be described later, so as to open and close a discharge opening 30a.

The upper door member 60 is moved up and down between a pair of guide protrusions 11 which protrude upwards from the base door body member 10, and when the upper door member is moved down so that the lower end thereof comes into contact with the upper end of the base door body member 10, closes the slag discharge port 1c.

When the upper end of the upper door member 60 comes into contact with the upper end of the discharge control door body 4, i.e. the upper portion of the base door body member 10, the slag discharge port 1c, i.e. the discharge opening 30a, is closed.

The upper door actuator 70 is mounted to the electric furnace 1 or another structure at the upper portion of the upper door member 60, and is illustratively actuated by either using a hydraulic or pneumatic cylinder equipped with a piston rod connected to the upper surface of the upper door member 60 or converting rotary force of an electric motor to a linear motion using the electric motor.

It should be noted that the door actuator 50 and the upper door actuator 70 may be modified to have an arbitrary structure for moving a door up and down.

The slag discharge door device of the invention may preferably further include an air jet unit 80 which projects air towards front and rear sides of the discharge control door body 4 at a lower portion of the door accommodation part 5b.

The air jet unit 80 includes a first jet nozzle 81 which is disposed on the front side of the discharge control door body 4 so as to project air upwards, a second jet nozzle 82 which is disposed on the rear side of the discharge control door body 4 so as to project air upwards, and an air supply 83 which supplies air to the first and second jet nozzle 81 and 82.

The air jet unit 80 projects air into a space in the proximity of the front and rear sides of the discharge control door body 4, in which the discharge control door body 4 is moved up and down, so as to prevent the space from being clogged with foreign matter such as slag, enabling smooth vertical movement of the discharge control door body 4 and smooth opening and closing of the slag discharge port 1c.

Figure 2:
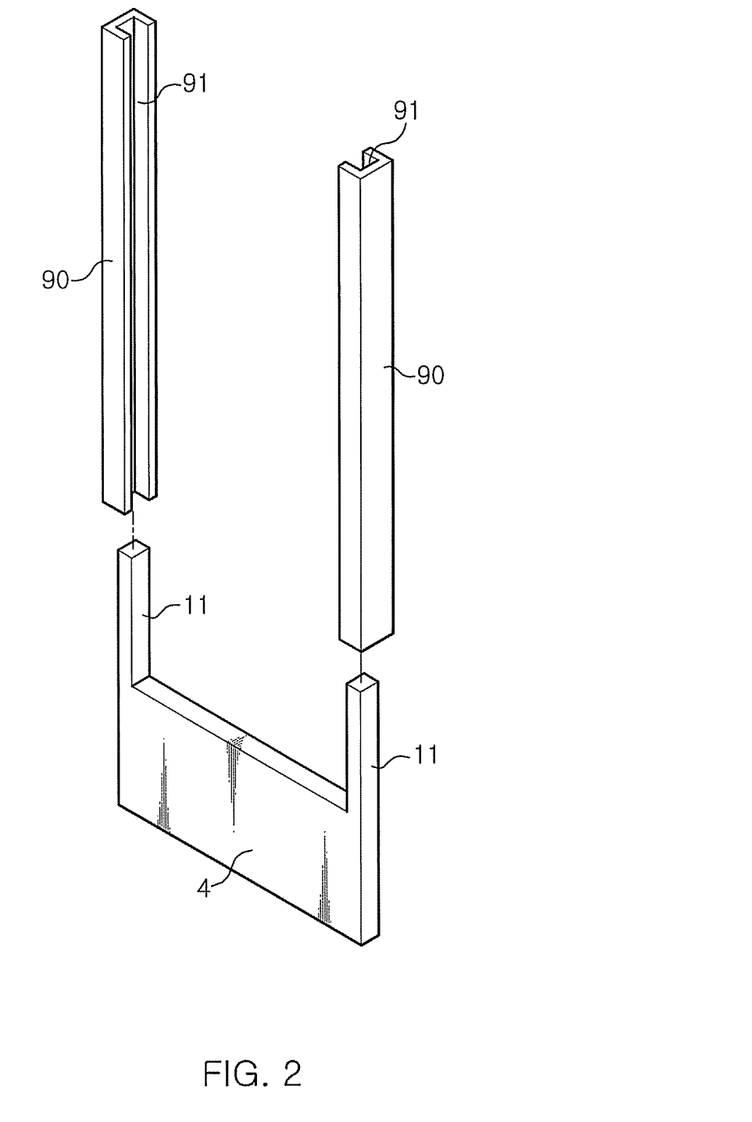
FIG. 2 is a perspective view of a discharge control door body according to an illustrative embodiment of the invention.

As shown in FIG. 2, the discharge control door body 4 has the pair of guide protrusions 11 on opposite sides of the upper portion thereof. The guide protrusions are separated by a distance via which slag is discharged from the electric furnace.

The slag in the electric furnace is discharged out through the space between the guide protrusions 11 of the discharge control door body 4. Inner surfaces of the guide protrusions 11 are slag contact surfaces that come into contact with the slag.

The upper surface of the support body 5, the front side of the discharge control door body 4 disposed inwards of the electric furnace, and inner surfaces of the guide protrusions 11 all are slag contact surfaces that come into contact with the slag.

The slag contact surface may preferably be coated with a hard coating layer 13.

The hard coating layer 13 has a base coating of Fe—Cr that facilitates the separation of solidified slag 3 and minimizes wear of the slag contact surface when the solidified slag is separated.

The slag discharge door device may preferably further include a pair of guide rail members 90 along which the discharge control door body 4 is moved up and down in order to open and close the slag discharge port 1c.

The guide rail members 90 are fixedly mounted to stand up straight at opposite sides of the slag discharge port 1c, and may illustratively have longitudinal guide grooves 91, respectively, into which opposite sides of the discharge control door body 4 are movably inserted.

That is to say, the guide rail members 90 may be configured such that the guide grooves 91 are fixedly formed straight in a direction in which the discharge control door body 4 is moved, i.e. in a vertical direction, in such a way so as to face each other at opposite sides of the slag discharge port 1c so that opposite sides of the discharge control door body 4 are movably inserted into the guide grooves 91.

Alternatively, the configuration may be modified such that the guide grooves 91 are formed on opposite sides of the discharge control door body 4, and the guide rail members 90 are mounted straight at opposite sides, respectively, of the discharge control door body 4, and respectively have protrusions (not shown) which are inserted into the guide grooves 91.

The guide rail member 90 may preferably be internally provided with a rail-cooling channel (not shown).

The rail-cooling channel circulates cooling water therethrough to cool the guide rail member 90, thereby preventing thermal deformation of the guide rail member 90 due to high temperature of the slag 3 discharged via the slag discharge port 1c.

The rail-cooling channel facilitates the solidification and removal of the slag 3 that is attached to the guide rail member 90 during the discharge of the slag 3.

Figure 3:
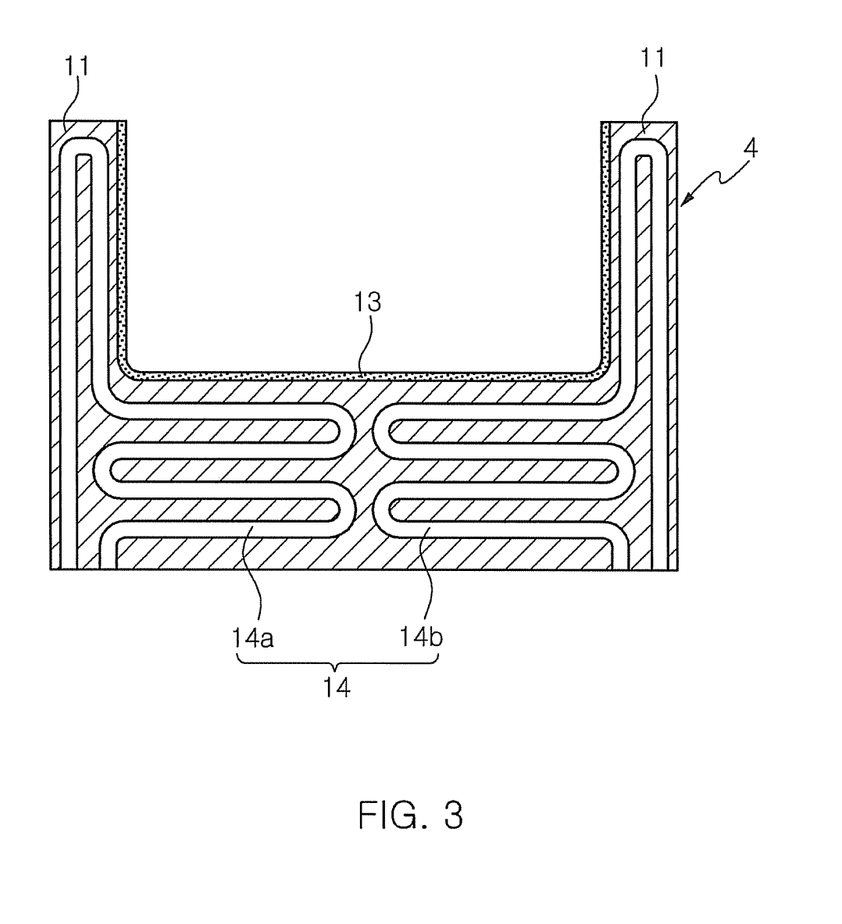
FIG. 3 is an exploded perspective view of a discharge control door body according to another illustrative embodiment of the invention.

Referring to FIG. 3, the discharge control door body 4 is internally provided with a cooling channel 14 through which cooling water is circulated, so as to prevent thermal deformation of the discharge control door body that occurs when coming into contact with high temperature slag 3.

The cooling channel 14 includes a first channel part 14a which is disposed on one side of the discharge control door body 4 to cool that side, and a second channel part 14b which is disposed on the other side of the discharge control door body 4 to cool that side. The first channel part 14a extends up to the guide protrusion 11 formed on one side of the discharge control door body 4, and the second channel part 14b extends up to the other guide protrusion 11 formed on the other side of the discharge control door body 4.

Each of the first and second channel parts 14a and 14b is disposed on one half side from center line of the discharge control door body 4 in a zigzag pattern in order to uniformly cool the one half side. The channel parts are independently supplied with cooling water and separately cool corresponding half sides of the discharge control door body 4, thereby improving the cooling efficiency.

The discharge control door body 4 is uniformly and rapidly cooled by cooling water circulated through the cooling channel 14, so that thermal deformation due to heat or high temperature of the slag 3 is prevented.

The slag discharge door device of the invention may preferably further include a water supply unit for supplying cooling water to the discharge control door body 4.

The water supply unit circulates cooling water to cool the discharge control door body 4. Although not shown in the figures, the water supply unit may preferably include a tank which supplies cooling water to the cooling channel 14, a circulating pipe which is connected between the tank and the cooling channel 14 to circulate the cooling water, and a heat exchanger which is mounted to the circulating pipe to cool the cooling water. The cooling water that is cooled is in turn circulated to the cooling channel.

Figure 4:
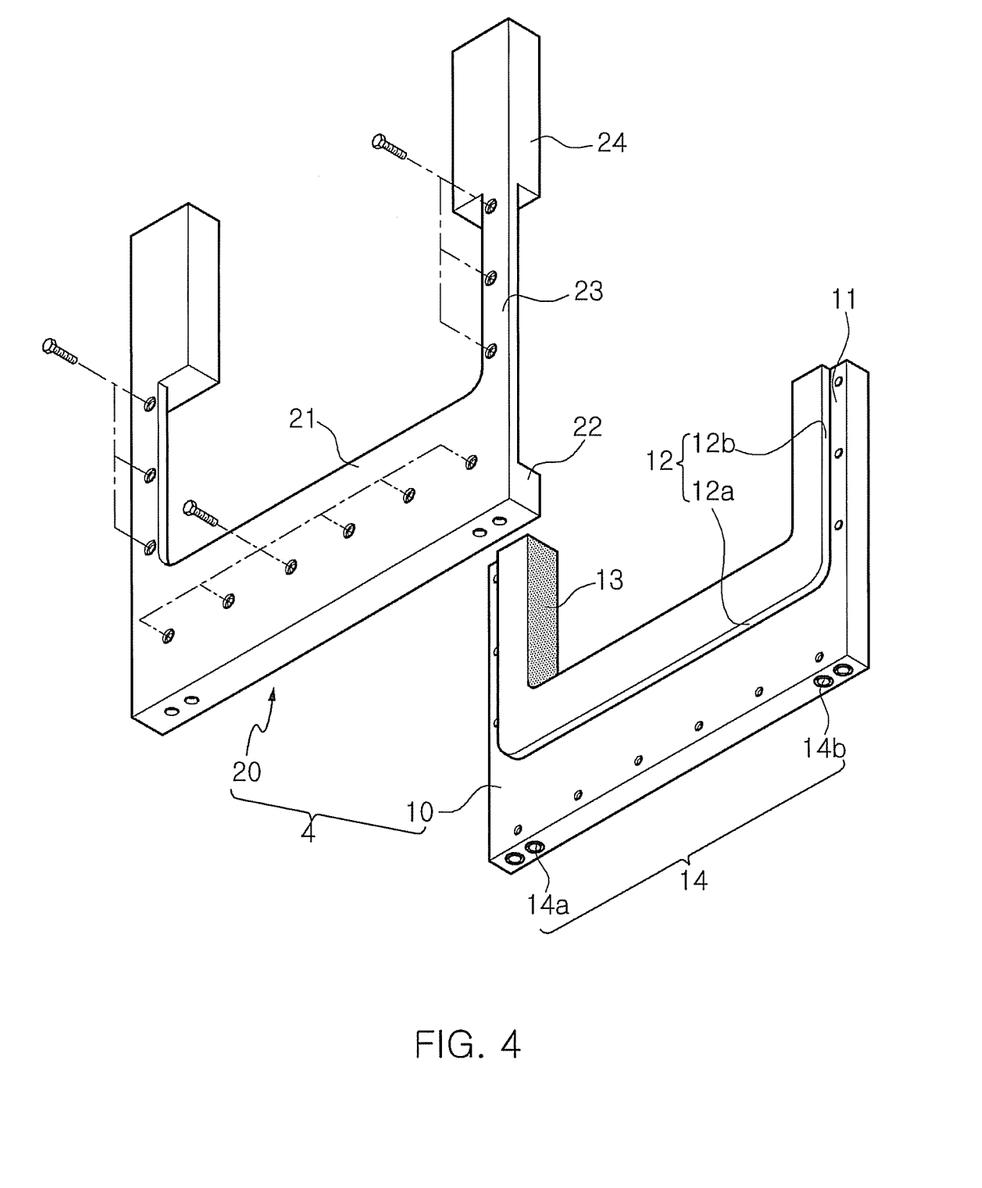
FIG. 4 is an exploded perspective view of a discharge control door body according to still another illustrative embodiment of the invention.

Referring to FIG. 4, the discharge control door body 4 includes a base door body member 10 formed of a high heat-conductive metal material and a door-reinforcing body member 20 which is coupled with the base door body member 10 at its lower portion so as to reinforce the stiffness of the base door body member 10. The base door body member 10 internally includes the cooling channel 14 and externally has slag contact surfaces on its upper and front sides.

The base door body member 10 has the slag contact surfaces that will contact the slag 3 in the electric furnace on its upper and front sides. The base door body member comes into contact with high temperature slag 3 to prevent an outflow of the slag 3, or discharges the slag 3 through the slag discharge port 1c of the electric furnace 1.

That is, a very important factor with the base door body member is to have high heat-conductivity (a high thermal conductivity rate), because the base door body member 10 comes into contact with high temperature slag 3, so most of the heat transferred from the high temperature slag 3 needs to dissipate in order to prevent thermal deformation due to high temperature.

Hence, the base door body member 10 may preferably be made of copper that is highly conductive and inexpensive, and has a relatively high melting point.

The inner surfaces of the guide protrusions in a pair are slag contact surfaces that will contact the slag 3 in the electric furnace.

The guide protrusions 11 serve to guide the discharge of the slag 3 with the inner surfaces thereof brought into contact with the slag, when the slag 3 in the electric furnace 1 is discharged towards the upper surface of the base door body member 10.

Further, the guide protrusions 11 protrude from opposite sides of the upper portion of the base door body member 10 to prevent the slag 3 from permeating into and being solidified at a guide groove 31 of a guide rail member 30.

The guide protrusions 11 preferably have a height corresponding at least to the level of the slag 3 in the electric furnace 1.

The base door body member 10 internally has the cooling channel 14 to prevent its thermal deformation and damage due to high temperature of the slag 3.

The base door body member 10 has, on the rear side thereof, a step portion 12 which protrudes from a base mounting plate part 21 of the door-reinforcing body member 20. The step portion 12 consists of a first step part 12a formed on the upper side of the base door body member 10 and second step parts 12b which protrude along the guide protrusions 11 from the opposite sides of the first step part 12a.

The step portion 12 serves as a slag contact surface which will contact the slag 3 that flows down on the rear side of the base door body member 10 when the slag discharge port 1c is opened.

That is, since, when discharged through the slag discharge port 1c, the slag 3 may flow down along and contact the rear side of the base door body member 10, it is preferred that the step portion 12 be formed on the rear side of the base door body member 10. Here, when the door-reinforcing body member 20 is assembled with the base door body member, the step portion is exposed through the base mounting plate part 21.

The front surface of the base door body member 10 that is directed towards the inside of the electric furnace, and the inner surfaces of the guide protrusions 11, are slag contact surfaces that will contact the slag 3.

The slag contact surface may preferably be provided with a hard coating layer 13.

The hard coating layer 13 has a base coating of Fe—Cr that facilitates the separation of solidified slag 3 and minimizes wear of the slag contact surface when the solidified slag is separated.

The base door body member 10 is formed of a high heat-conductive metal material such as copper.

The base door body member 10 is assembled with the door-reinforcing body member 20 in order to reinforce its stiffness to bear external shocks when moved up and down.

The door-reinforcing body member 20 is formed of high strength steel, and includes the base mounting plate part 21 to which the rear side of the base door body member 10 is mounted, a lower support protrusion part 22 which protrudes from the lower portion of the base mounting plate part to support the lower portion of the base door body member 10, guide mounting plate parts in a pair which extend upwards from opposite sides of an upper portion of the base mounting plate part 21 and to which the rear sides of the guide protrusions are mounted, and guide support protrusion parts in a pair which protrude from the guide mounting plate parts 23 to support the upper portions of the guide protrusions 11.

The door-reinforcing body member 20 is assembled onto the base door body member 10 to surround the lower surface of the base door body member 10, and outer surfaces and upper end sides of the guide protrusions 11, thereby reinforcing the stiffness of the base door body member 10.

The base door body member 10 is integrally assembled with the door-reinforcing body member 20 by screwing a plurality of bolts to the door-reinforcing body member 20 through the base mounting plate part 21 and the guide mounting plate parts 23.

The discharge control door body 4 is formed with a door body made of a heterogeneous material having a high heat-conductive material and a high strength material, that is, a combination of the base door body member 10 of high heat-conductive metal and the door-reinforcing body member 20 of high strength steel. Thereby, heat transferred from slag 3 when blocking the discharge of the slag dissipates effectively to minimize thermal deformation and damage due to heat, thereby increasing the durability and lifetime of the door body.

Figure 5:
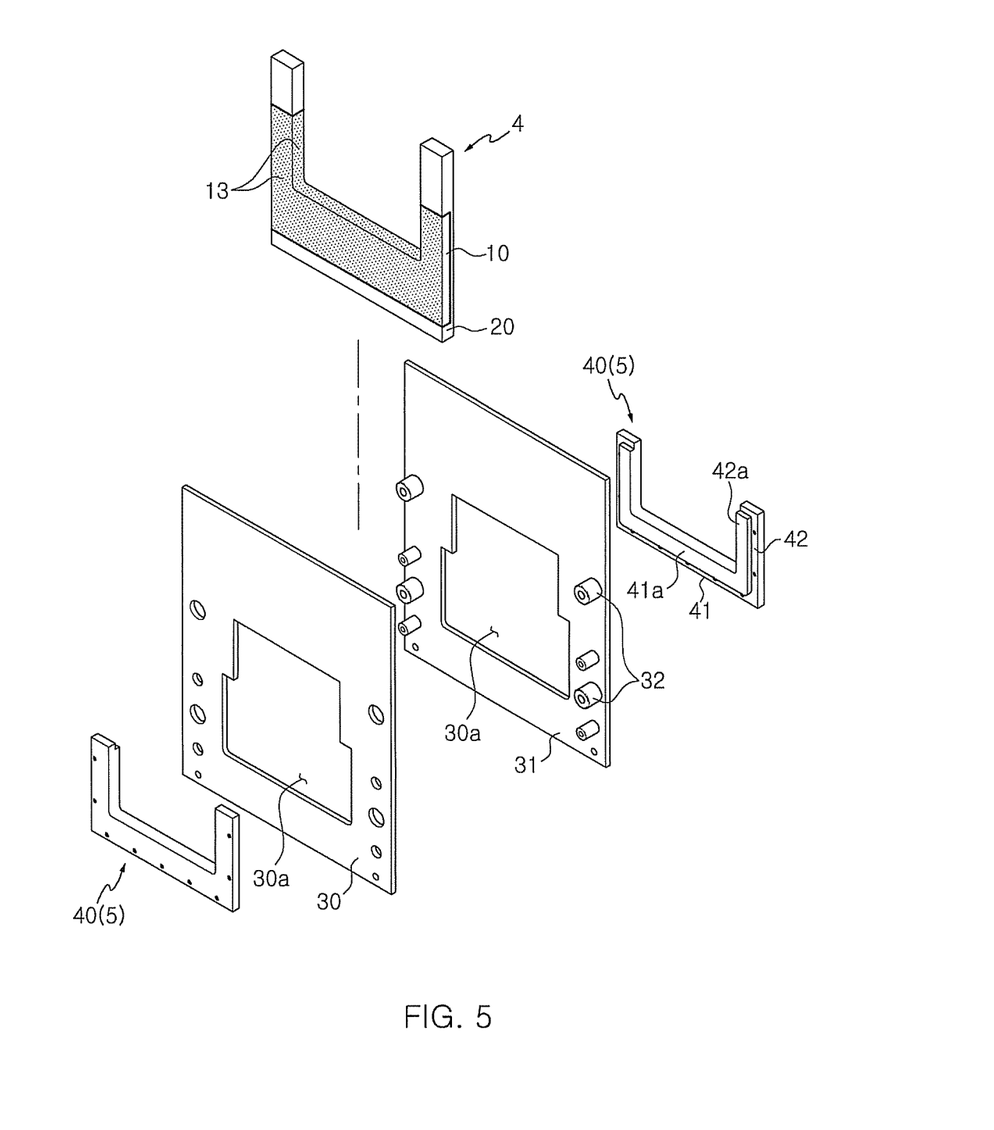
FIG. 5 is a sectional view of a slag discharge door device according to an illustrative embodiment of the invention.
Figure 6:
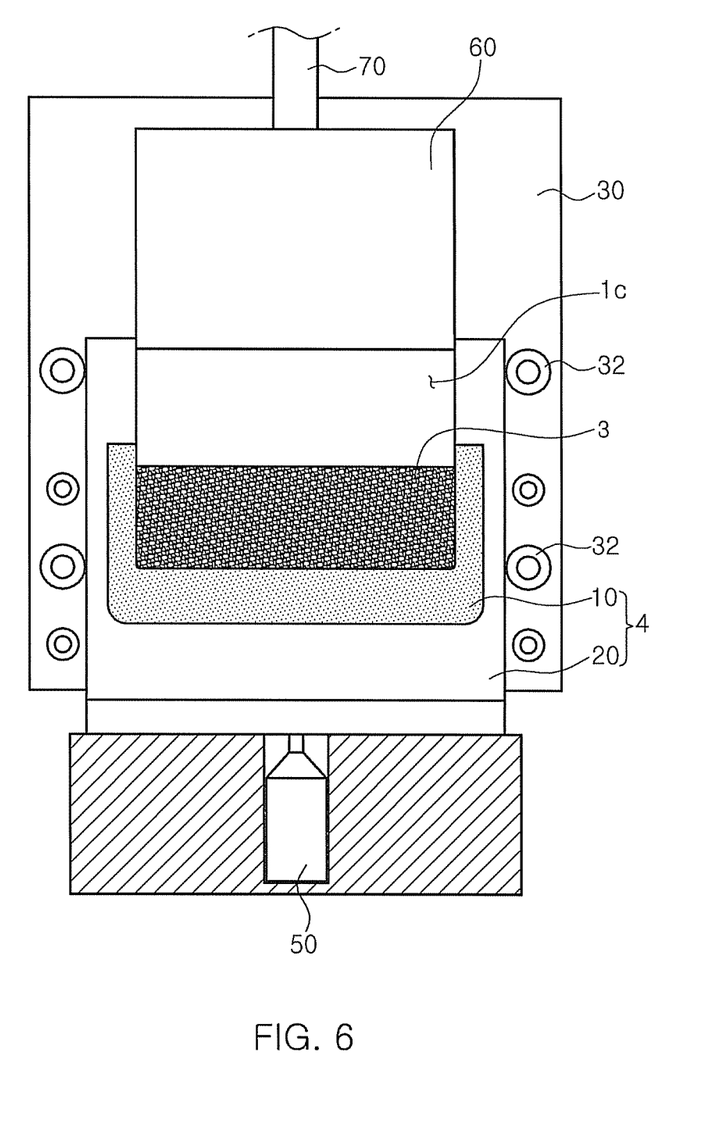
FIG. 6 is a front view of the slag discharge door device according to the illustrative embodiment of the invention.

An illustrative discharge control door body 4 will now be described with reference to FIGS. 5 and 6.

The door body includes a first guide plate member 30 which guides a vertical motion of the discharge control door body 4 while supporting the rear side thereof and has a discharge opening 30a, and a second guide plate member 31 which guides a vertical motion of the discharge control door body 4 while supporting the front side thereof and has a discharge opening 30a that corresponds to the discharge opening 30a of the first guide plate member 30.

The discharge opening 30a communicates with the slag discharge port 1c and allows the slag 3 to be discharged therethrough.

The support body 5 further includes a slag-guide support member 40 which is mounted to the first and second guide plate members 30 and 31 to surround a lower portion and opposite sides of the discharge opening 30a.

The slag-guide support member 40 includes: a lower support part 41 which is mounted to a lower side of the discharge openings 30a of the first and second guide plate members 30 and 31, and has, on its mounting surface, a first discharge guide protrusion part 41a which covers the lower side of the discharge opening 30a; and A pair of side-support parts 42 which extend from opposite sides of an upper portion of the lower support part 41 and are mounted to opposite sides of the discharge openings 30a of the first and second guide plate members 30 and 31 have, on their mounting surfaces, second discharge guide parts 42a which are connected to the upper portion of the first discharge guide protrusion part 41a and cover opposite sides of the discharge openings 30a of the first and second guide plate members 30 and 31.

The slag-guide support member 40 is formed of high heat-conductive metal such as copper.

Although not shown in the figures, the slag-guide support member 40 internally has a channel through which cooling water is circulated.

The channel prevents thermal deformation and damage of the slag-guide support member 40 due to high temperature heat of the slag.

The slag-guide support member 40 is mounted such that the upper surface of the lower support part 41 coincides with the upper surface of the base support body member 5a at an upper side of a door accommodation part 5b of the base support body member 5a, so as to guide the discharge of the slag while contacting the slag that is discharged out from the electric furnace through the discharge opening 30a.

The slag discharge door device of the invention may preferably further include a plurality of guide roller members 32 which are disposed between the first and second guide plate members 30 and 31 such that the guide roller members can be rotated when brought into contact with the sides of the discharge control door body 4.

The guide roller members 32 guide the vertical motion of the discharge control door body 4 when vertically moved in order to open and close the discharge opening 30a, thereby enabling a smooth vertical motion of the discharge control door body 4.

Figure 7:
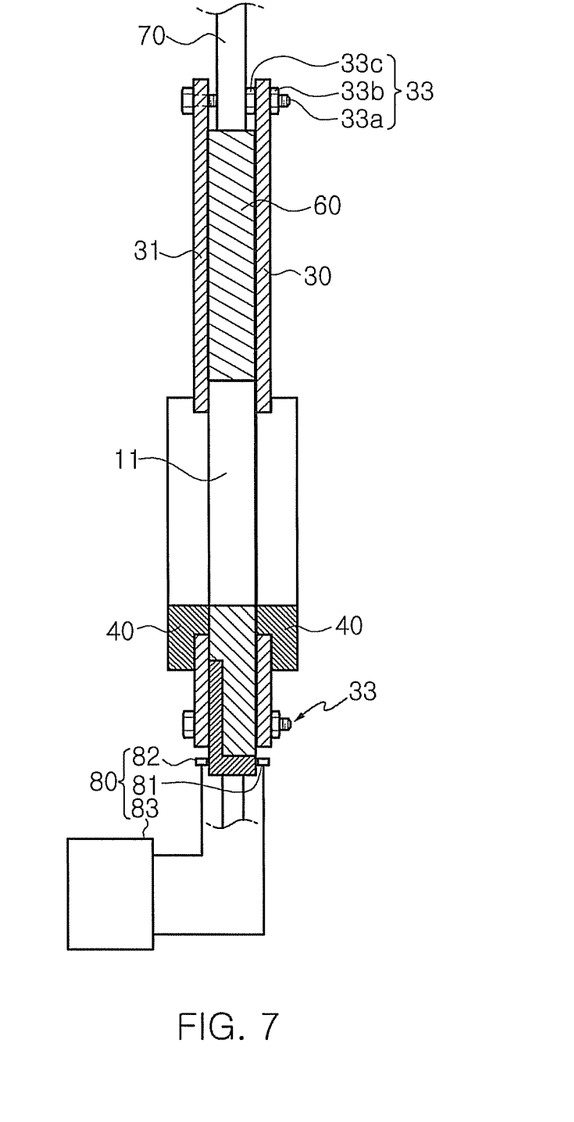
FIG. 7 is a sectional view of a discharge control door body according to an illustrative embodiment of the invention.

Referring to FIG. 7, the discharge control door body 4 of the invention may preferably further include a gap-adjusting unit 33 which adjusts a gap between the first and second guide plate members 30 and 31.

The gap between the first and second guide plate members 30 and 31 is adjusted such that the first and second guide plate members 30 and 31 are in the closest proximity to the front and rear sides of the discharge control door body 4 if the discharge control door body 4 can be vertically moved within the gap.

The gap-adjusting unit 33 adjusts the gap between the first and second guide plate members 30 and 31 in order to minimize inflow of the slag into gaps between the first guide plate member 30 and the discharge control door body 4 and between the second guide plate member 31 and the discharge control door body 4.

Further, when foreign matter such as slag is inserted into the gap, the gap-adjusting unit 33 adjusts the gap between the first and second guide plate members 30 and 31 in order to remove the foreign matter.

The gap-adjusting unit 33 includes a gap-adjusting bolt 33a which is screwed through the first and second guide plate members 30 and 31, a first fastening nut 33b which is provided on at least one side of the first and second guide plate members 30 and 31 and to which the gap-adjusting bolt 33a is fastened, and a second fastening nut 33c to which the gap-adjusting bolt 33a is fastened between the first and second guide plate members 30 and 31.

The gap between the first and second guide plate members 30 and 31 is adjusted by a degree of the gap-adjusting bolt 33a being screwed to the first fastening nut 33b.

The adjusted gap between the first and second guide plate members 30 and 31 is fixed by fastening the second fastening nut 33c to either a head part or distal end part of the gap-adjusting bolt 33a.

A detailed description will be given of a control procedure of the discharge of slag during a steel-making process in an electric furnace 1, using the slag discharge door device of the invention.

Figure 8:
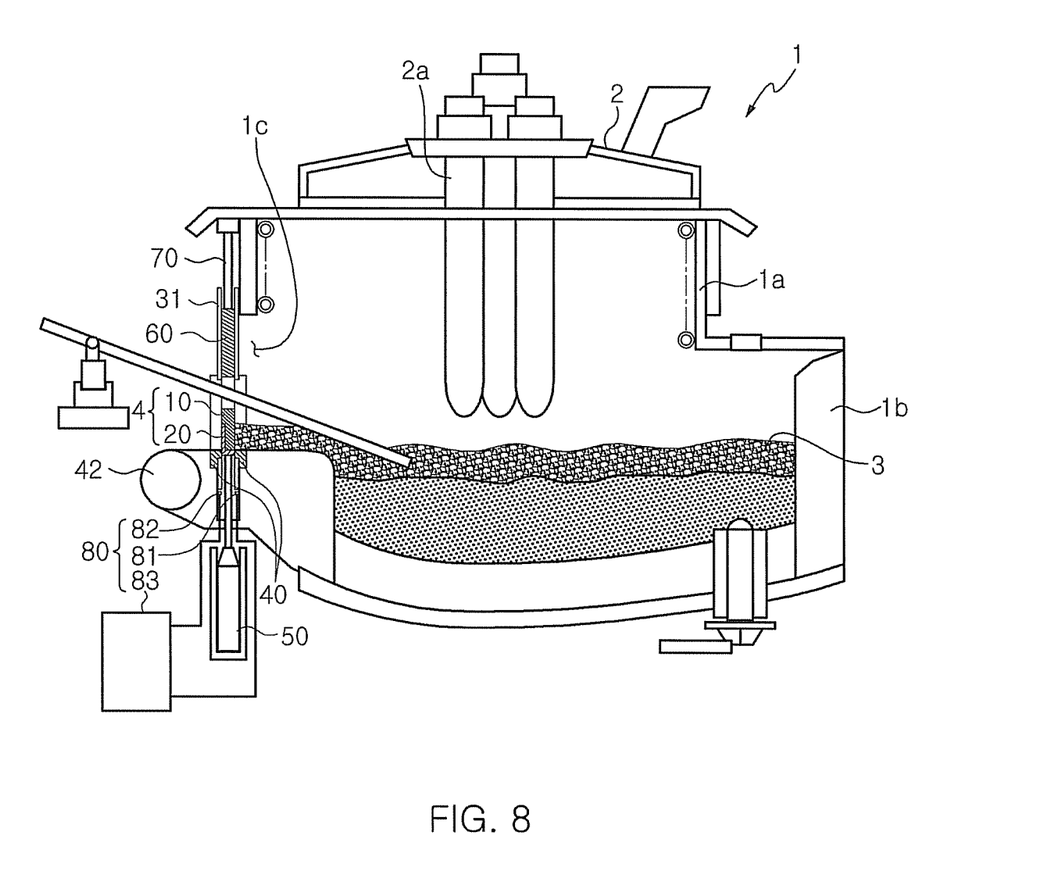
FIGS. 8 to 10 are pictorial views showing the states of the slag discharge door device in use.
Figure 9:
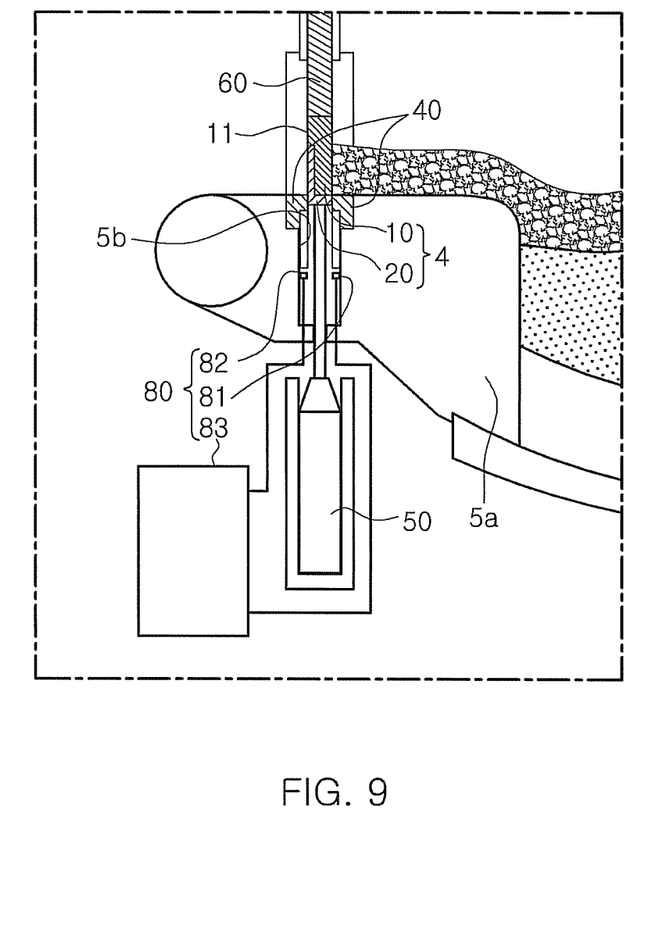

Referring to FIGS. 8 and 9, slag 3 which is formed on the surface of molten steel during a steel-making process in an electric furnace 1 expands in volume during recarburizing in oxidation refining, and the expanded slag 3 is introduced into the slag discharge port 1c.

Initial slag 3 that expands during such an oxidation refining process contains a large quantity of valuable metal oxides such as ferrous oxides (FeO).

The discharge control door body 4 has a higher height than the surface level of the slag 3 above the support body 5 so as to block the discharge opening 30a, i.e., the slag discharge port 1c, thereby preventing the discharge of the expanded initial slag 3.

That is, the discharge control door body 4 is located above the support body 5 to have a higher height than the surface level of the slag 3 that expands in volume by slag foaming in the oxidation refining, thereby preventing the discharge of the slag.

Here, the slag 3 contacts only a contact part 12 protruding from the front side of the base door body member 10 at the slag discharge port 1c.

The upper door member 60 can open and close the slag discharge port 1c at the upper portion of the discharge control door body 4.

That is, in a state where the discharge control door body 4 is moved up from the slag-guide support member 40 to prevent the discharge of the slag 3, the upper door member 60 is moved up to partially open the slag discharge port 1c.

Hence, during a steel-making process such as oxidation refining, the upper door member 60 is moved up to open the slag discharge port 1c, and then a lance or a thermometer can be introduced into the electric furnace 1.

The upper door member 60 is configured to move down up to the level exactly above the level of the slag 3 when the discharge control door body 4 is moved down so as to discharge the slag 3, thereby serving to prevent the discharge of internal heat and internal gases of the electric furnace 1 and inflow of external air into the electric furnace when the slag is discharged.

Figure 10:
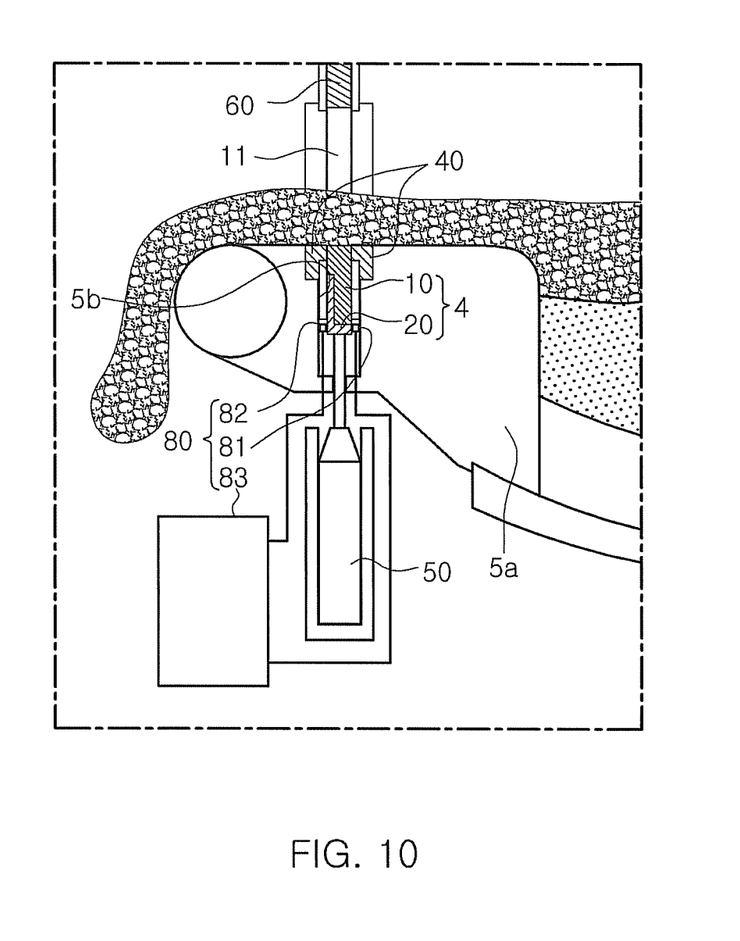

As shown in FIG. 10, the discharge control door body 4 is configured to discharge the slag 3 when the upper surface of the base door body member 10 is moved down so as to coincide with the upper surface of the slag-guide support member 40, i.e., the upper surface of the lower support part 41.

Here, the slag 3 contacts the upper surface of the base door body member 10 and the inner surfaces of the guide protrusions 11.

When the discharged slag 3 is solidified at the upper surface of the slag-guide support member 40, the discharge control door body 4 moves up and down so as to separate and remove the solidified slag 3.

According to the present invention, the operation of the discharge control door body 4 and the upper door member 60 has the effects of controlling the outflow of slag, reducing heat losses due to the outflow of slag 3, increasing the efficiency of arc heat due to the formation of foamed slag, and recovering valuable metals from the molten slag, thereby increasing the percentage of molten steel recovered.

It should be noted that the present invention is not limited to the above-mentioned embodiments, and various modifications covered by the configuration of the invention may be made without departing from the scope of the invention.

The invention claimed is:

1. A slag discharge door device for an electric furnace, comprising:
   a support body disposed at a lower portion of a slag discharge port formed on one side of the electric furnace, slag flowing out along an upper surface of the support body;
   a discharge control door body that is to vertically moved from the upper surface of the support body to control the discharge of the slag;
   a door actuator for vertically actuating the discharge control door body;
   a first guide plate member guiding a vertical motion of the discharge control door body while supporting a rear side thereof and having a discharge opening; and
   a second guide plate member guiding a vertical motion of the discharge control door body while supporting a front side thereof and having a discharge opening corresponding to that of the first guide plate member,
   wherein the support body comprises:
   a base support body member having a door accommodation part into which the discharge control door body is inserted; and
   a slag-guide support member mounted to the first and second guide plate members to surround a lower portion and opposite sides of the discharge opening.

2. The slag discharge door device as set forth in claim 1, further comprising a plurality of guide roller members disposed between the first and second guide plate members such that the guide roller members can be rotated when brought into contact with the sides of the discharge control door body.

3. The slag discharge door device as set forth in claim 1, further comprising a gap-adjusting unit for adjusting a gap between the first and second guide plate members.

4. The slag discharge door device as set forth in claim 3, wherein the gap-adjusting unit comprises:
   a gap-adjusting bolt screwed through the first and second guide plate members;
   a first fastening nut provided on at least one side of the first and second guide plate members and to which the gap-adjusting bolt is fastened; and
   a second fastening nut to which the gap-adjusting bolt is fastened between the first and second guide plate members.

5. A slag discharge door device for an electric furnace, comprising:
   a support body disposed at a lower portion of a slag discharge port formed on one side of the electric furnace, slag flowing out along an upper surface of the support body;
   a discharge control door body that is to vertically moved from the upper surface of the support body to control the discharge of the slag;
   a door actuator for vertically actuating the discharge control door body;
   wherein the discharge control door body comprises:
   a base door body member formed of a high heat-conductive metal material and internally having a cooling channel along which cooling water flows and externally having slag contact surfaces on its upper and front sides;
   a first guide plate member and a second guide plate member that support a rear side and a front side respectively, of the discharge control door body; and a door-reinforcing body member coupled with the base door body member at its lower portion so as to reinforce the stiffness of the base door body member, wherein the base door body member has, on opposite sides of an upper portion thereof, guide protrusions separated from each other, wherein the door reinforcing body member comprises:

a base mounting plate part to which a rear side of the base door body member is mounted;

a lower support protrusion part protruding from a lower portion of the base mounting plate part to support the lower portion of the base door body member;

a pair of guide mounting plate parts extending upwards from opposite sides of an upper portion of the base mounting plate part and to which rear sides of the guide protrusions are mounted; and a pair of guide support protrusion parts protruding from the guide mounting plate parts to surround and support outer sides and upper portions of the guide protrusions.

6. The slag discharge door device as set forth in claim 5, wherein the base door body member is formed of copper.

7. A slag discharge door device for an electric furnace, comprising:

a support body disposed at a lower portion of a slag discharge port formed on one side of the electric furnace, slag flowing out along an upper surface of the support body;

a discharge control door body that is to vertically moved from the upper surface of the support body to control the discharge of the slag;

a door actuator for vertically actuating the discharge control door body;

wherein the discharge control door body comprises:

a base door body member formed of a high heat-conductive metal material and internally having a cooling channel along which cooling water flows and externally having slag contact surfaces on its upper and front sides; and a door-reinforcing body member coupled with the base door body member at its lower portion so as to reinforce the stiffness of the base door body member, wherein the base door body member has, on opposite sides of an upper portion thereof, guide protrusions separated from each other, wherein the door-reinforcing body member comprises:

a base mounting plate part to which a rear side of the base door body member is mounted;

a lower support protrusion part protruding from a lower portion of the base mounting plate part to support the lower portion of the base door body member;

a pair of guide mounting plate parts extending upwards from opposite sides of an upper portion of the base mounting plate part and to which rear sides of the guide protrusions are mounted; and a pair of guide support protrusion parts protruding from the guide mounting plate parts to surround and support outer sides and upper portions of the guide protrusions.

* * * * *